United States Patent
Wilson et al.

(10) Patent No.: US 10,370,991 B2
(45) Date of Patent: Aug. 6, 2019

(54) GAS TURBINE ENGINE AND SEAL ASSEMBLY THEREFORE

(71) Applicant: UNITED TECHNOLOGIES CORPORATION, Farmington, CT (US)

(72) Inventors: Ross Wilson, South Glastonbury, CT (US); Michael G McCaffrey, Windsor, CT (US); John R Farris, Bolton, CT (US); Theodore W Hall, Berlin, CT (US); John J Korzendorfer, Glastonbury, CT (US); Elizabeth F. Vinson, Wethersfield, CT (US); Jeffrey Michael Jacques, East Hartford, CT (US); Edwin Otero, Southington, CT (US); John E Paul, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 867 days.

(21) Appl. No.: 14/830,636

(22) Filed: Aug. 19, 2015

(65) Prior Publication Data
US 2016/0130963 A1    May 12, 2016

Related U.S. Application Data

(60) Provisional application No. 62/076,859, filed on Nov. 7, 2014.

(51) Int. Cl.
*F02C 1/00*     (2006.01)
*F01D 11/00*    (2006.01)
*F16J 15/44*    (2006.01)
*F01D 11/02*    (2006.01)

(52) U.S. Cl.
CPC .......... *F01D 11/001* (2013.01); *F01D 11/025* (2013.01); *F16J 15/44* (2013.01); *F05D 2240/55* (2013.01); *F05D 2260/38* (2013.01); *F05D 2260/96* (2013.01)

(58) Field of Classification Search
CPC ........ F01D 11/02; F01D 11/001; F01D 11/16; F01D 11/12; F01D 11/025; F01D 11/08
See application file for complete search history.

(56) References Cited

U.S. PATENT DOCUMENTS

| | | | |
|---|---|---|---|
| 7,896,352 B2 * | 3/2011 | Justak | F16J 15/442 277/411 |
| 8,002,285 B2 | 8/2011 | Justak | |
| 2007/0258826 A1 * | 11/2007 | Bracken | F01D 9/042 416/234 |
| 2008/0265513 A1 * | 10/2008 | Justak | F01D 11/025 277/301 |
| 2011/0121519 A1 * | 5/2011 | Justak | F01D 11/025 277/412 |
| 2012/0223483 A1 * | 9/2012 | Bidkar | F01D 11/025 277/301 |

\* cited by examiner

*Primary Examiner* — Gerald L Sung
(74) *Attorney, Agent, or Firm* — Cantor Colburn LLP

(57) ABSTRACT

The present disclosure relates generally to a hydrostatic advanced low leakage seal having a shoe supported by at least two beams. An anti-vibration beam spacer is disposed in contact with two adjacent beams and operative to mitigate an externally induced vibratory response of the beams.

17 Claims, 5 Drawing Sheets

GAS TURBINE ENGINE AND SEAL ASSEMBLY THEREFORE

CROSS REFERENCE TO RELATED APPLICATION

This application claims the benefit of and incorporates by reference herein the disclosure of U.S. Ser. No. 62/076,859, filed Nov. 7, 2014.

TECHNICAL FIELD OF THE DISCLOSURE

The present disclosure is generally related to hydrostatic advanced low leakage seals and, more specifically, to a system and method for dampening vibration in a hydrostatic advanced low leakage seal.

BACKGROUND OF THE DISCLOSURE

So-called hydrostatic advanced low leakage seals, or hybrid seals, such as those described in U.S. Pat. No. 8,002,285 to name one non-limiting example, exhibit less leakage compared to traditional knife edge seals while exhibiting a longer life than brush seals. In one non-limiting example, the hybrid seal may be used to seal between a stator and a rotor within a gas turbine engine. The hybrid seal is mounted to one of the stator or the rotor to maintain a desired gap dimension between the hybrid seal and the other of the stator and rotor. The hybrid seal has the ability to 'track' the relative movement between the stator and the rotor throughout the engine operating profile when a pressure is applied across the seal. The hybrid seal tracking surface is attached to a solid carrier ring via continuous thin beams. These beams enable the low resistance movement of the hybrid seal in a radial direction. The dimensions of the beams exhibit vibrational characteristics that could be excited in the engine operating environment. Improvements in such hybrid seals are therefore desirable.

SUMMARY OF THE DISCLOSURE

In one embodiment, a seal assembly disposed between a stator and a rotor is disclosed, the seal assembly comprising: a hydrostatic advanced low leakage seal including: a base; a shoe; and a spring element including a first spring element end operatively coupled to the base and a second spring element end operatively coupled to the shoe, the spring element further comprising: a first beam extending between the first and second spring element ends; and a second beam extending between the first and second spring element ends and radially spaced from the first beam; and a first beam spacer disposed in contact with the first beam and the second beam and operative to mitigate an externally induced vibratory response of the spring element; wherein the base is operatively coupled to one of the stator and the rotor.

In a further embodiment of the above, the base is operatively coupled to the stator.

In a further embodiment of any of the above, the first beam spacer is held in contact with the first and second beams by friction.

In a further embodiment of any of the above, the first beam spacer dampens more than one mode of resonant vibration.

In a further embodiment of any of the above, a u-shaped plate defining an interior cavity is disposed between the base and the stator, wherein the base and the spring element are disposed within the cavity.

In a further embodiment of any of the above, a spacer is operatively disposed between the spring element and the u-shaped plate; wherein the u-shaped plate includes a first recess formed therein; wherein the spacer includes a second recess formed therein; and wherein a first end of the first beam spacer is disposed in the first recess and a second end of the first beam spacer is disposed in the second recess.

In a further embodiment of any of the above, the first beam spacer comprises a cross-sectional shape selected from the group consisting of: rectangular, rectangular with radiused corners, circular, oval, and diamond shaped.

In a further embodiment of any of the above, the first beam spacer is disposed substantially equidistant from the first and second spring element ends.

In a further embodiment of any of the above, a second beam spacer is disposed in contact with the first beam and the second beam; wherein the first beam spacer and the second beam spacer are disposed asymmetrically about a center equidistant from the first and second spring element ends.

In another embodiment, a gas turbine engine is disclosed comprising: a compressor section, a combustor section and a turbine section in serial flow communication, at least one of the compressor section and turbine section including a stator, a rotor, and a seal assembly, the seal assembly comprising: a hydrostatic advanced low leakage seal including: a base; a shoe; and a spring element including a first spring element end operatively coupled to the base and a second spring element end operatively coupled to the shoe, the spring element further comprising: a first beam extending between the first and second spring element ends; and a second beam extending between the first and second spring element ends and radially spaced from the first beam; and a first beam spacer disposed in contact with the first beam and the second beam and operative to mitigate an externally induced vibratory response of the spring element; wherein the base is operatively coupled to one of the stator and the rotor.

In a further embodiment of any of the above, the base is operatively coupled to the stator.

In a further embodiment of any of the above, the first beam spacer is held in contact with the first and second beams by friction.

In a further embodiment of any of the above, the first beam spacer dampens more than one mode of resonant vibration.

In a further embodiment of any of the above, a u-shaped plate defining an interior cavity is disposed between the base and the stator, wherein the base and the spring element are disposed within the cavity.

In a further embodiment of any of the above, a spacer is operatively disposed between the spring element and the u-shaped plate; wherein the u-shaped plate includes a first recess formed therein; and wherein the spacer includes a second recess formed therein; and wherein a first end of the first beam spacer is disposed in the first recess and a second end of the first beam spacer is disposed in the second recess.

In a further embodiment of any of the above, the first beam spacer comprises a cross-sectional shape selected from the group consisting of: rectangular, rectangular with radiused corners, circular, oval, and diamond shaped.

In a further embodiment of any of the above, the first beam spacer is disposed substantially equidistant from the first and second spring element ends.

In a further embodiment of any of the above, a second beam spacer is disposed in contact with the first beam and the second beam; wherein the first beam spacer and the second beam spacer are disposed asymmetrically about a center equidistant from the first and second spring element ends.

In another embodiment, a seal assembly disposed between a stator and a rotor is disclosed, the seal assembly comprising: a hydrostatic advanced low leakage seal including: a base; a plurality of shoes; a plurality of spring elements, each including a first spring element end operatively coupled to the base and a second spring element end operatively coupled to a respective one of the plurality of shoes, each of the plurality of spring elements further comprising: a first beam extending between the first and second spring element ends; and a second beam extending between the first and second spring element ends and radially spaced from the first beam; and a first beam spacer disposed in contact with the first beam and the second beam and operative to mitigate an externally induced vibratory response of the spring element; wherein the base is operatively coupled to one of the stator and the rotor.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
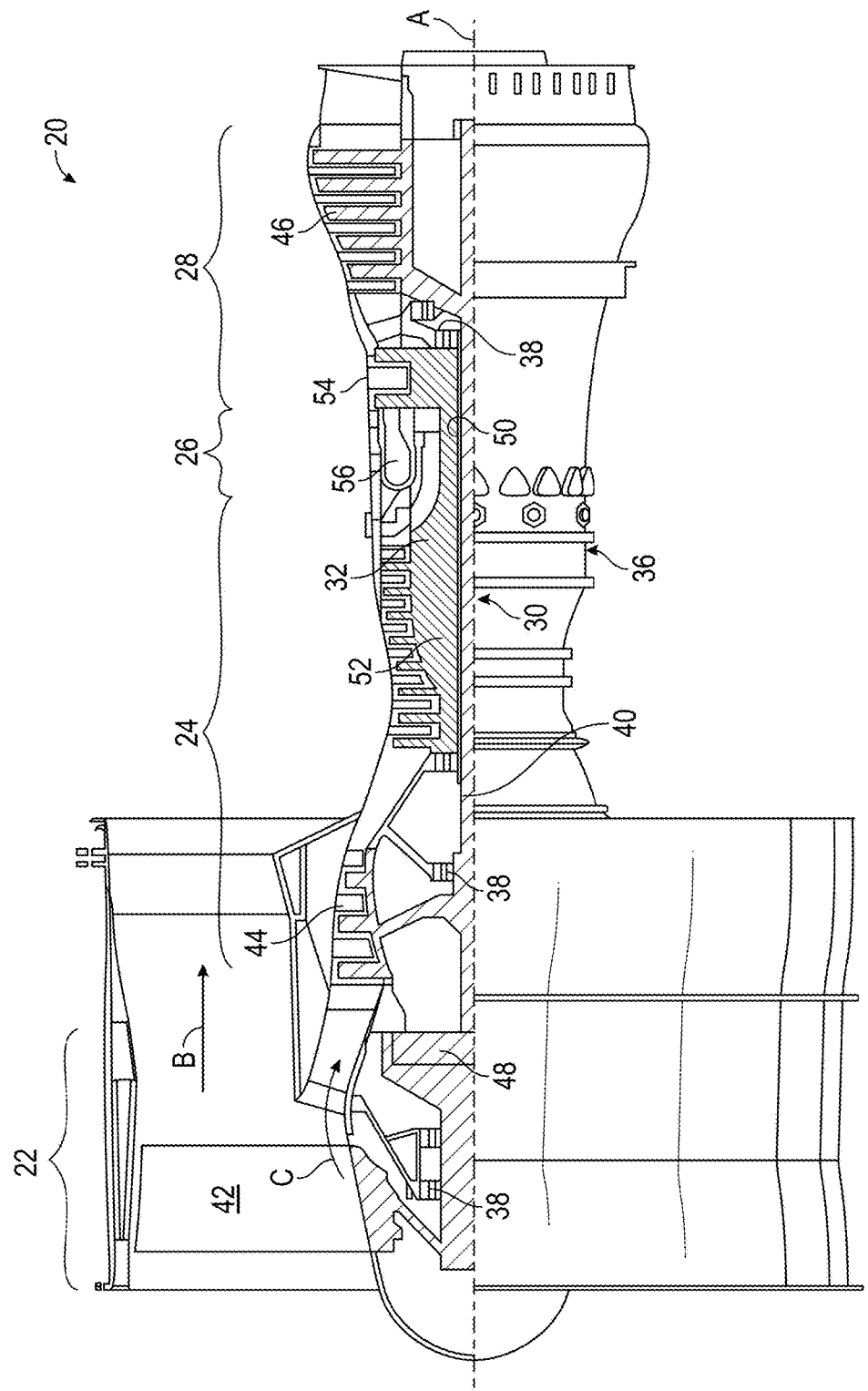
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 m/sec).

FIGS. 2-6 schematically illustrate a hydrostatic advanced low leakage seal, or hybrid seal, indicated generally at 100, and its associated carrier components. Although the hybrid seal 100 is shown mounted on a stator 102, it will be appreciated that the hybrid seal 100 could alternatively be mounted to a rotor 104. The hybrid seal 100 is intended to create a seal of the circumferential gap 106 between two relatively rotating components, such as the fixed stator 102 and a rotating rotor 104. The hybrid seal 100 includes a base portion 107 and at least one, but often a plurality of circumferentially spaced shoes 108 which are located in a non-contact position along the exterior surface of the rotor 104. Each shoe 108 is formed with a sealing surface 110. For purposes of the present disclosure, the term "axial" or "axially spaced" refers to a direction along the longitudinal axis of the stator 102 and rotor 104, whereas "radial" refers to a direction perpendicular to the longitudinal axis.

Figure 2:
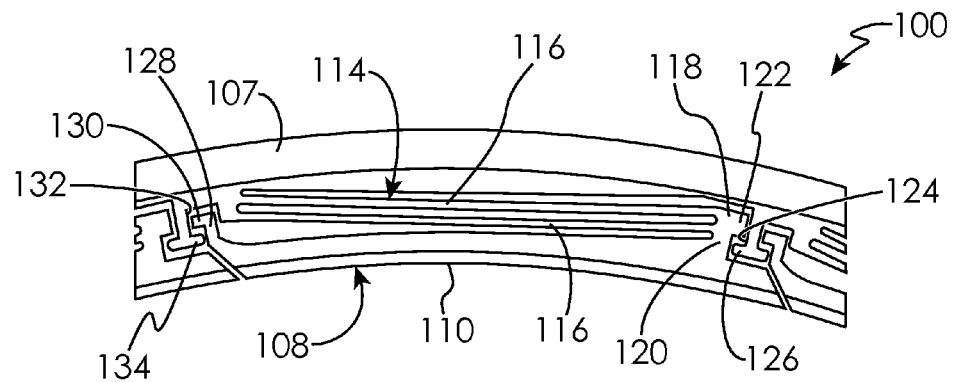
FIG. 2 is a schematic elevational view of a hybrid seal in an embodiment.

Under some operating conditions, it is desirable to limit the extent of radial movement of the shoes 108 with respect to the rotor 104 to maintain tolerances, e.g. the spacing between the shoes 108 and the facing surface of the rotor 104. The hybrid seal 100 includes at least one circumferentially spaced spring element 114, the details of one of which are best seen in FIG. 2. Each spring element 114 is formed with at least two beams 116. One end of each of the beams 116 is mounted to or integrally formed with the base 107 and the opposite end thereof is connected to a first stop 118. The first stop 118 includes a strip 120 which is connected to the shoe 108, and has an arm 122 which may be received within a recess 124 formed in the base 107. The recess 124 has a shoulder 126 positioned in alignment with the arm 122 of the first stop 118.

A second stop 128 is connected to or integrally formed with the strip 120, and, hence connects to the shoe 108. The second stop 128 is circumferentially spaced from the first stop 118 in a position near the point at which the beams 116 connect to the base 107. The second stop 128 is formed with an arm 130 which may be received within a recess 132 in the base 107. The recess 132 has a shoulder 134 positioned in alignment with the arm 130 of second stop 128.

Particularly when the hybrid seal 100 is used in applications such as gas turbine engines, aerodynamic forces are developed which apply a fluid pressure to the shoe 108 causing it to move radially with respect to the rotor 104. The fluid velocity increases as the gap 106 between the shoe 108 and rotor 104 increases, thus reducing pressure in the gap 106 and drawing the shoe 108 radially inwardly toward the rotor 104. As the gap 106 closes, the velocity decreases and the pressure increases within the gap 106, thus forcing the shoe 108 radially outwardly from the rotor 104. The spring elements 114 deflect and move with the shoe 108 to create a primary seal of the circumferential gap 106 between the rotor 104 and stator 102 within predetermined design tolerances. The purpose of first and second stops 118 and 128 is to limit the extent of radially inward and outward movement of the shoe 108 with respect to the rotor 104 for safety and operational limitation. A gap is provided between the arm 122 of first stop 118 and the shoulder 126, and between the arm 130 of second stop 128 and shoulder 134, such that the shoe 108 can move radially inwardly relative to the rotor 104. Such inward motion is limited by engagement of the arms 122, 130 with shoulders 126 and 134, respectively, to prevent the shoe 108 from contacting the rotor 104 or exceeding design tolerances for the gap 106 between the two. The arms 122 and 130 also contact the base 107 in the event the shoe 108 moves radially outwardly relative to the rotor 104, to limit movement of the shoe 108 in that direction.

Energy from adjacent mechanical or aerodynamic excitation sources (e.g. rotor imbalance, flow through the seal, other sections of the engine, etc.) may be transmitted to the seal 100, potentially creating a vibratory response in the seal 100. Such vibratory responses create vibratory stress leading to possible reduced life of the seal 100, and can be large enough to cause unintended deflections of the shoes 108.

The presently disclosed embodiments employ vibration tuning of the seal 100 assembly in order to minimize or eliminate the creation of a vibratory response in the spring elements 114 of the seal 100. By introducing vibration tuning into the seal 100, resonate vibration of the beams 116 at one or more frequencies may be dampened. The resulting vibratory response and thus vibratory stress and deflections will therefore be reduced.

Figure 3:
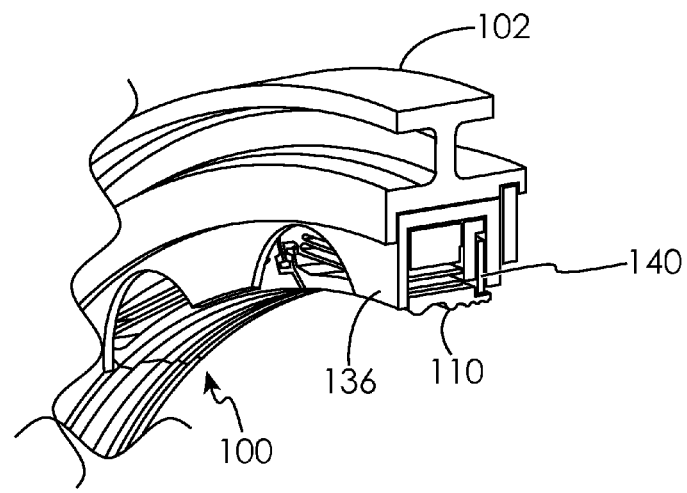
FIG. 3 is a schematic perspective view of a hybrid seal and carrier in an embodiment.
Figure 4:
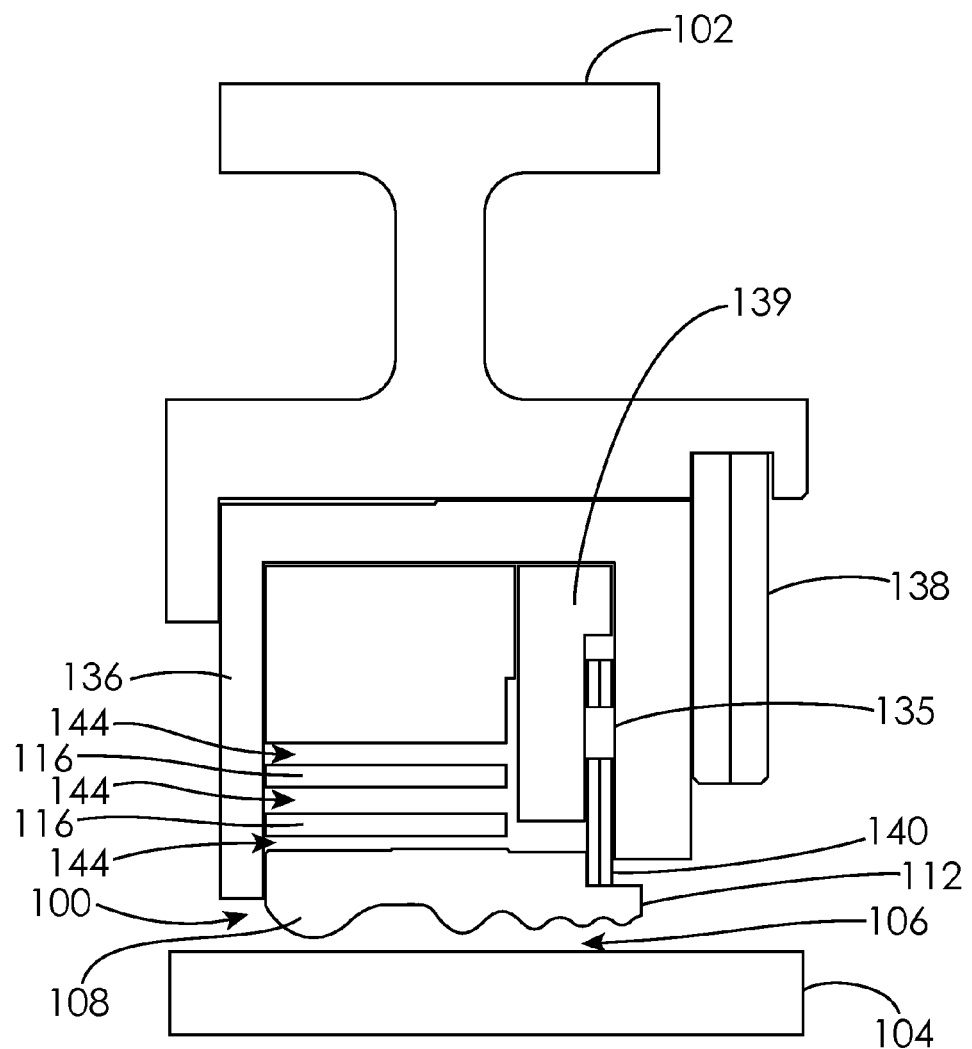
FIG. 4 is a schematic cross-sectional view of a rotor, a stator, and a hybrid seal in an embodiment.
Figure 5:
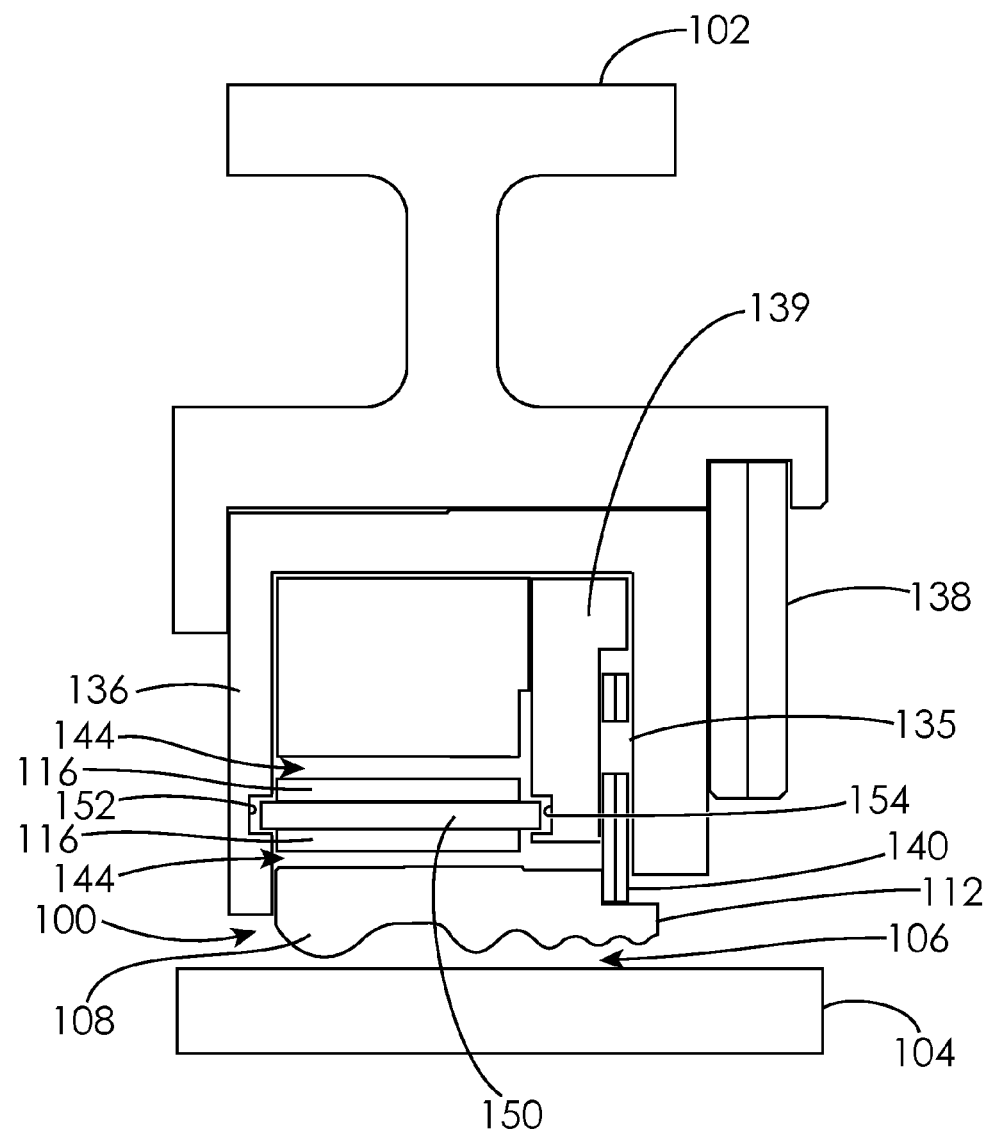
FIG. 5 is a schematic cross-sectional view of a rotor, a stator, and a hybrid seal in an embodiment.
Figure 6:
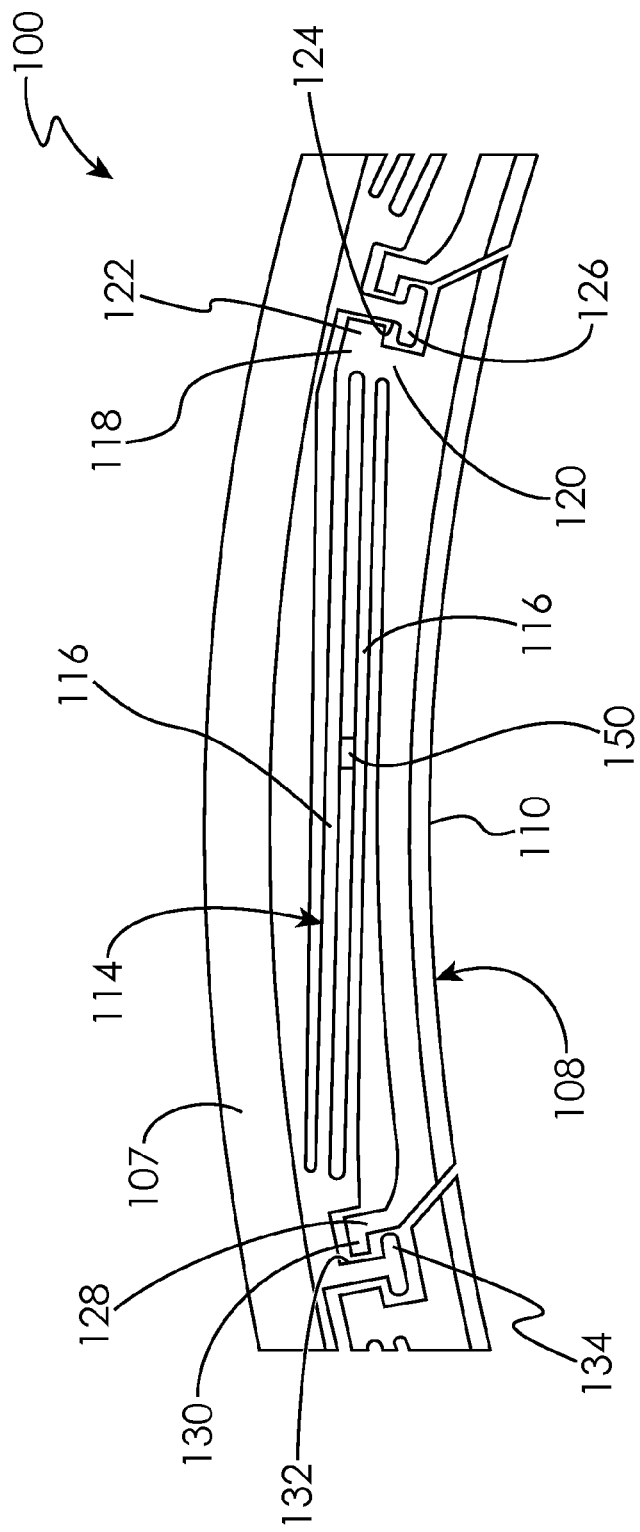
FIG. 6 is a schematic elevational view of a hybrid seal in an embodiment.

As shown in FIGS. 3-5, in some embodiments the hybrid seal 100 may be attached to stator 102 by means of a circumferential u-shaped plate 136 operatively coupled thereto. The u-shaped plate 136 may be fixed between an extending wall 137 of the stator 102 and a retaining ring 138 and a spacer 139 in an embodiment. The spacer 139 decouples the secondary seal 140 from the base 107. An anti-rotation pin 135 may extend from the spacer 139.

The hybrid seal 100 may also be provided with a secondary seal 140. The secondary seal 140 is positioned so that one end thereof engages the flange 112. The secondary seal 140 deflects with the radial inward and outward movement of the shoe 108, in response to the application of fluid pressure as noted above, in such a way as to create a secondary seal preventing fluid flow through the gaps 144 between the beams 116. The secondary seal 140 may be formed from a flexible material, such as a brush seal or a sheet metal seal to name just two non-limiting examples, to allow for radial movement of the shoe 108.

The secondary seal 140 rubs on the shoe 108 when a pressure difference is applied across the hybrid seal 100. The friction from such rubbing creates a damping effect to mitigate any potential shoe 108 vibratory response to an externally induced excitation (such as an engine induced excitation). However, the secondary seal 140 does not mitigate any potential spring element 114/beam 116 vibratory response to an externally induced excitation. Therefore, at least one beam spacer 150 is provided disposed between and in contact with two adjacent beams 116. The beam spacer 150 is sized such that it is held in place between the beams 116 by friction between the beam spacer and the beams 116 in an embodiment. The beam spacer 150 dampens through friction at least the first mode of resonant vibration of the beams 116, and in some embodiments higher modes, to mitigate any potential beam-only vibratory response modes to an externally induced excitation (such as an engine induced excitation).

Axial movement of the beam spacer 150 may be limited by disposing respective ends thereof in a first recess 152 formed in u-shaped plate 136 and a second recess 154 formed in the spacer 139 in an embodiment. In other embodiments, the spacer 139 is not present and the beam spacer 150 is constrained by other system components. It will be appreciated that the means for constraining movement of the beam spacer 150 is not critical. In one embodiment, a beam spacer 150 is positioned between at least two beams 116 of each shoe 108 around the circumference of the seal 100. The cross-sectional shape of the beam spacer 150 may be rectangular, circular, oval, diamond shaped, or any other desired shape. In one embodiment, the cross-sectional shape of the beam spacer 150 is rectangular with the corners radiused to remove sharp edges. The beam spacer 150 may be formed from a material that is compatible with the operating environment of the seal 100, and which exhibits an acceptable wear couple with the material from which the beams 116 are formed. In some embodiments, a single beam spacer 150 is disposed between each pair of beams 116, while in other embodiments a plurality of beam spacers 150 are disposed between each pair of beams 116. The beam spacer 150 may be centered between the opposite circumferential ends of the spring element 114, or may be displaced circumferentially from the center. In some embodiments where a plurality of beam spacers 150 are disposed between a pair of beams 116, the plurality of beam spacers 150 may be disposed asymmetrically about the center.

The addition of the beam spacer 150 to rub the beams 116 and therefore mitigate beam 116 vibratory response modes will prevent premature hybrid seal 100 material failure. The beam-only response modes do not compromise hybrid seal 100 flow performance, but do compromise the hybrid seal 100 life metric if the beam 116 response modes respond in the engine-installed location.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal assembly disposed between a stator and a rotor, the seal assembly comprising:
a hydrostatic advanced low leakage seal including:
a base;
a shoe; and
a spring element including a first spring element end operatively coupled to the base and a second spring element end operatively coupled to the shoe, the spring element further comprising:
a first beam extending between the first and second spring element ends; and
a second beam extending between the first and second spring element ends and radially spaced from the first beam; and
a first beam spacer disposed in contact with the first beam and the second beam and operative to mitigate an externally induced vibratory response of the spring element;
wherein the base is operatively coupled to one of the stator and the rotor and the first beam spacer is held in contact with the first and second beams by friction.

2. The seal assembly of claim 1, wherein the base is operatively coupled to the stator.

3. The seal assembly of claim 2, further comprising:
a u-shaped plate defining an interior cavity, the u-shaped plate disposed between the base and the stator, wherein the base and the spring element are disposed within the cavity.

4. The seal assembly of claim 3, further comprising:
a spacer operatively disposed between the spring element and the u-shaped plate; wherein the u-shaped plate includes a first recess formed therein;
wherein the spacer disposed between the spring element and the u-shaped plate includes a second recess formed therein; and
wherein a first end of the first beam spacer is disposed in the first recess and a second end of the first beam spacer is disposed in the second recess.

5. The seal assembly of claim 1, wherein the first beam spacer dampens more than one mode of resonant vibration.

6. The seal assembly of claim 1, wherein the first beam spacer comprises a cross-sectional shape, wherein the cross-sectional shape is one of: rectangular, rectangular with radiused corners, circular, oval, and diamond shaped.

7. The seal assembly of claim 1, wherein the first beam spacer is disposed substantially equidistant from the first and second spring element ends.

8. The seal assembly of claim 1, further comprising:
a second beam spacer disposed in contact with the first beam and the second beam;
wherein the first beam spacer and the second beam spacer are disposed asymmetrically about a center equidistant from the first and second spring element ends.

9. A gas turbine engine comprising:
a compressor section, a combustor section and a turbine section in serial flow communication, at least one of the compressor section and turbine section including a stator, a rotor, and a seal assembly, the seal assembly comprising:
a hydrostatic advanced low leakage seal including:
a base;
a shoe; and
a spring element including a first spring element end operatively coupled to the base and a second spring element end operatively coupled to the shoe, the spring element further comprising:
a first beam extending between the first and second spring element ends; and
a second beam extending between the first and second spring element ends and radially spaced from the first beam; and a first beam spacer disposed in contact with the first beam and the second beam and operative to mitigate an externally induced vibratory response of the spring element;
wherein the base is operatively coupled to one of the stator and the rotor and the first beam spacer is held in contact with the first and second beams by friction.

10. The gas turbine engine of claim 9, wherein the base is operatively coupled to the stator.

11. The seal assembly of claim 10, further comprising: a u-shaped plate defining an interior cavity, the u-shaped plate disposed between the base and the stator, wherein the base and the spring element are disposed within the cavity.

12. The seal assembly of claim 11, further comprising:
a spacer operatively disposed between the spring element and the u-shaped plate; wherein the u-shaped plate includes a first recess formed therein; and
wherein the spacer disposed between the spring element and the u-shaped plate includes a second recess formed therein; and
wherein a first end of the first beam spacer is disposed in the first recess and a second end of the first beam spacer is disposed in the second recess.

13. The seal assembly of claim 9, wherein the first beam spacer dampens more than one mode of resonant vibration..

14. The seal assembly of claim 9, wherein the first beam spacer comprises a cross-sectional shape wherein the cross-sectional shape is one of: rectangular, rectangular with radiused corners, circular, oval, and diamond shaped.

15. The seal assembly of claim 9, wherein the first beam spacer is disposed substantially equidistant from the first and second spring element ends.

16. The seal assembly of claim 9, further comprising:
a second beam spacer disposed in contact with the first beam and the second beam;
wherein the first beam spacer and the second beam spacer are disposed asymmetrically about a center equidistant from the first and second spring element ends.

17. A seal assembly disposed between a stator and a rotor, the seal assembly comprising:
a hydrostatic advanced low leakage seal including:
a base;
a plurality of shoes;
a plurality of spring elements, each including a first spring element end operatively coupled to the base and a second spring element end operatively coupled to a respective one of the plurality of shoes, each of the plurality of spring elements further comprising:
a first beam extending between the first and second spring element ends; and a second beam extending between the first and second spring element ends and radially spaced from the first beam; and
a first beam spacer disposed in contact with the first beam and the second beam and operative to mitigate an externally induced vibratory response of the spring element;
wherein the base is operatively coupled to one of the stator and the rotor and the first beam spacer is held in contact with the first and second beams by friction.

* * * * *